United States Patent
Sharma et al.

(10) Patent No.: US 9,635,088 B2
(45) Date of Patent: Apr. 25, 2017

(54) METHOD AND SYSTEM FOR MANAGING USER STATE FOR APPLICATIONS DEPLOYED ON PLATFORM AS A SERVICE (PAAS) CLOUDS

(71) Applicant: Accenture Global Services Limited, Dublin (IE)

(72) Inventors: Vibhu Saujanya Sharma, Aligarh (IN); Shubhashis Sengupta, Bangalore (IN); Annervaz Karukapadath Mohamedrasheed, Kerala (IN)

(73) Assignee: Accenture Global Services Limited, Dublin (IE)

( * ) Notice: Subject to any disclaimer, the term of this patent is extended or adjusted under 35 U.S.C. 154(b) by 475 days.

(21) Appl. No.: 13/758,631

(22) Filed: Feb. 4, 2013

(65) Prior Publication Data
US 2014/0149485 A1    May 29, 2014

(30) Foreign Application Priority Data
Nov. 26, 2012    (IN) .............................. 4905/CHE/2012

(51) Int. Cl.
*G06F 15/16*    (2006.01)
*H04L 29/08*    (2006.01)

(52) U.S. Cl.
CPC ............ *H04L 67/02* (2013.01); *H04L 67/142* (2013.01)

(58) Field of Classification Search
CPC ............... H04L 29/08072; H04L 29/06; H04L 29/08135; H04L 29/004; H04L 29/08075; H04L 29/00; H04L 67/00
(Continued)

(56) References Cited

U.S. PATENT DOCUMENTS

2002/0138551 A1* 9/2002 Erickson ........................ 709/203
2003/0074395 A1* 4/2003 Eshghi et al. ................ 709/203
(Continued)

OTHER PUBLICATIONS https://www.rabbitmq.com/tutorials/tutorial-two-python.html Wayback machine dated Mar. 20, 2011.*
(Continued)

*Primary Examiner* — Jeffrey R Swearingen
*Assistant Examiner* — Messeret F Gebre
(74) *Attorney, Agent, or Firm* — Brinks Gilson & Lione

(57) ABSTRACT

The REsilient LOosely Coupled (ReLoC) system and method implement a session-state management architecture for cloud computing that uses loosely-coupled services and platform agnostic scalable messaging technology to propagate and save session states. Maintaining the state of applications and user sessions is difficult in large scale web-based software systems, particularly in the context of cloud computing (e.g., platform as a service (PaaS) vendors, do not explicitly support state management infrastructure, such as clustering). In a PaaS environment, a user has little or no access and control over the server platform and session management layer. The platform tiers are generally loosely coupled and service-oriented, which make traditional session-state management techniques non-usable. The ReLoC system and method provides a high level of tolerance to failures of the platform tiers without corresponding disruptions in user sessions. In the context of PaaS Clouds, the ReLoC system provides greater scalability compared to traditional clustering environments.

19 Claims, 8 Drawing Sheets

(58) Field of Classification Search
USPC .......................................................... 709/202
See application file for complete search history.

(56) References Cited

U.S. PATENT DOCUMENTS

| | | | |
|---|---|---|---|
| 2004/0078684 A1* | 4/2004 | Friedman et al. | ............... 714/38 |
| 2007/0136311 A1* | 6/2007 | Kasten | ................ H04L 67/1008 |
| 2010/0180208 A1* | 7/2010 | Kasten | ................ G06F 12/0873 715/745 |

OTHER PUBLICATIONS

Chang-Kyu Lee, Sung-Hei Kim, Shin-Gak Kang, "Session management of relay-based overlay multicast for managed group applications", Aug. 2009 ICHIT '09: Proceedings of the 2009 International Conference on Hybrid Information Technology Publisher: ACM, pp. 425-429.*

A. J. Choudhury, P. Kumar, M. Sain, H. Lim and H. Jae-Lee, "A Strong User Authentication Framework for Cloud Computing," Services Computing Conference (APSCC), 2011 IEEE Asia-Pacific, Jeju Island, 2011, pp. 110-115.*

Doo Young Lee; Dong-Hee Shin, "An empirical evaluation of multi-media based learning of a procedural task", Computers in Human Behavior 28.3 (May 2012), pp. 1072-1081, pp. 1072-1081.*

Xinwen Zhang, Joshua Schiffman, Simon Gibbs, Anugeetha Kunjithapatham, and Sangoh Jeong, "Securing elastic applications on mobile devices for cloud computing", Proceeding of the 2009 ACM workshop on Cloud, pp. 127-134.*

Sharma et al., "ReLoC: A Resilient Loosely Coupled Application Architecture for State Management in the Cloud," 2012 IEEE Fifth International Conference on Cloud Computing, pp. 906-913, ISSN: 2159-6182, current version dated Aug. 2, 2012, issue date Jun. 24-29, 2012 (10 pp. with publication information).

* cited by examiner

METHOD AND SYSTEM FOR MANAGING USER STATE FOR APPLICATIONS DEPLOYED ON PLATFORM AS A SERVICE (PAAS) CLOUDS

PRIORITY CLAIM

This application claims the benefit of priority to India application Serial No. 4905/CHE/2012, filed on Nov. 26, 2012.

TECHNICAL FIELD

The present description relates generally to a system and method, generally referred to as a system, for managing user state for applications deployed on platform-as-a-service (PaaS) clouds, and more particularly, but not exclusively, to a session-state management architecture for PaaS clouds that uses loosely-coupled services and platform agnostic scalable messaging technology to propagate, store and retrieve session states.

BACKGROUND

As more organizations adopt cloud computing for developing and deploying applications on outsourced infrastructure, a new set of capabilities and challenges have emerged. While cloud computing promises seemingly elastic capacity and scaling, certain present architectural limitations in cloud platforms limit the seamless transition of applications to clouds (e.g., state management and fault tolerance in the stacks of different Platform-as-a-Service (PaaS) clouds). Many cloud deployments are limited to stateless applications and compute or data driven batch-oriented services, such as printing and e-mail, hosting of web servers and simple parallel batch processing services such as image processing. Porting and managing applications with states is more difficult because applications with states are dependent on capturing, propagating and maintaining user session states in global application and/or transactional contexts, and failure of any of the nodes along the transactional path affect the global state of the application.

Preserving individual the user session state is important in enterprise class applications where one of the concerns is to provide a stable user experience and maintain the application state even if the application goes down. In a PaaS environment, a user has little or no access and control over the server platform and session management layer. Additionally, the platform tiers are generally loosely coupled and service-oriented. These make traditional session-state management techniques non-usable. PaaS platforms typically perform mapping and routing a user request to the service end-point of the appropriate execution container and load balancing across execution containers. However, these platforms may not provide customized application level load balancing, nor may these platforms implement user session management for specific application instances hosted in a container.

Adoption of PaaS cloud services for enterprise applications has mostly been confined to edge services of a software system, such as single instance simple e-commerce applications, office productivity suites (directory services, printing, and e-mail), and other scalable stateless services like cache-based lookups, and content serving. Core enterprise services, such as persistence and communication heavy processes, critical concurrent transaction processing applications, and business process management services are not typically run on public PaaS clouds. Current PaaS platforms, in general, do not support state management through clustering, hardware fault tolerance or other means. Platforms like Microsoft® Azure have recently added a distributed cache which assists storing and retrieving the state by a service. Platforms like RedHat's® OpenShift have Java application server (JBoss) clustering support. However many emerging PaaS platforms like VMware's® Cloud-Foundry, Elastic Bean-Stalk from Amazon® Web Services, Heroku from SalesForce.com®, Engine Yard, and Jelastic still do not appear to have a readymade solution for properly implemented PaaS cloud services. These platforms provide very limited support for configuring the platform (e.g., the application server), and thus approaches such as application server clustering cannot be achieved as such. Further, there are many new PaaS platforms emerging almost every month and thus the set of possible deployment targets for applications is ever expanding.

Traditional approaches unfortunately may not work well in the context of cloud computing. Cloud architecture is typified by low-cost commodity infrastructure (hardware and links) with higher node failure propensity, horizontal scaling (scale-out) of services, loosely coupled components and asynchronous communication across these components. Cloud architecture traditionally allows scaling in a stateless manner and failures of components must be confined within a node. Although in case of Infrastructure-as-a-Service (IaaS) clouds, an organization may deploy the organization's own virtual machines with the requisite cluster management aware stacks the IaaS approach is in direct contrast to the very notion of elasticity and horizontal scalability. In case of Platform-as-a-Service (PaaS) cloud providers, traditional modes for achieving state management may not be employed, because PaaS providers typically do not allow the infrastructure (such as web or application servers) configuration to be tweaked. For example, PaaS providers cannot create direct connections from application containers to databases to enable container managed state persistence, or change local cache size to allow local buffering and management of session states. Moreover, the PaaS providers by themselves do not generally support clustering.

SUMMARY

The REsilient LOosely Coupled (ReLoC) architecture provides system and method that provide user session management. The ReLoC system comprises one or more memories, including a first memory couple to a computer processor, the first memory comprising one or more handler agents. The handler agents may each include a user interface configured to receive a session object request that identifies a session object, and when the session object request is serviced, communicate a session object response that results from servicing the session object request. The first memory or another memory may include handler agent logic that communicates, via a message queue, with application instances accessible through application agents in communication with the handler agent. The one or more handler agents, application agents, and hash table agent subscribe to the message queue. The handler agent logic determines one or more of the application agents to which to forward the session object request (e.g., based on availability of the application in stance and/or the load of the application agents and/or the application instances), and forwards the message queue message to the determined one or more application agents. The ReLoC system includes a hash table agent comprising and/or in communication with a second memory, where the hash table agent is configured to identify a hash-mapped key-value that identifies at least one location, including the first memory or the second memory or both, or another memory location, to store or retrieve a session object and state of the session object (e.g., application state or context, and/or user session state). The first memory may further include application agents logic configured to receive the session object request from the handler agent, communicate a request for session object state of the session object to the hash table agent, and receive the session object and the session object state from the hash table agent. The application agents logic services the session object request based on the requested session object state, using the available application instances accessible through application agents, to obtain a session object request result. The application agents logic communicates an updated session object state and the session object request result to the hash table agent, and communicates the session object response to the handler agent based on the session object request result. The one or more application agents send to the hash table agent, via the message queue, a message queue message that identifies the session object, and receive from the hash table agent a message with the session object and the state of the session object. The application agents logic is further configured to read the session object request, de-serialize the session object and read the session object value in order to update the session object state or the application context or both. The Hash Table Agent mediates database reads and writes for storing and retrieving session objects. The session object request may be a HTTP request object (e.g., a HTTP request), and the session object response may be a HTTP response object (e.g., a HTTP response). The application agents communicate availability status of the application instances to the handler agent via another message queue message comprising the availability status. The hash table agent uses the session object request to generate a hash-mapped key-value that identifies the at least one location to store the session object in a Key-value store Hash Table, when the session object request is a request to store the session object. The hash table agent uses the session object request to generate another hash-mapped key-value that identifies the at least one location from which to retrieve the session object from a Key-value store Hash Table, when the session object request is a request to retrieve the session object. The handler agent logic is further configured to: receive from the application instances availability information for the application instances available to service the session object request, where the application agents communicate availability status of the application instances to the handler agent via another message queue message. The handler agent logic is further configured to wrap the session object request in a message queue message, and serialize the session object using standard Java serialization.

Core enterprise services require retrieval, maintenance and synchronization of the states of the applications and the transactional data across client invocations (generally termed as session state) and across several running process instances (generally termed as application process state). The session and process states are relatively difficult to maintain under high-loads without adequate infrastructural support for failure tolerance and high-availability. The core enterprise services make use of hardware and software clustering to maintain the session and process states. Clustering is very difficult and costly to achieve in a scale-out, commodity-type public PaaS cloud infrastructure. Additionally, the cost of traditional state management and communication protocols increase rapidly under load and beyond a threshold this makes scaling out an extremely difficult and costly proposition.

In order to be portable, the ReLoC system provides a platform agnostic application that provides explicit support for state management. The application architecture supports the state management without relying on the underlying platform (e.g., PaaS). The ReLoC system provides a framework for application level state management in view of existing and emerging PaaS cloud architectures. The ReLOC system provides storing and synchronization of session and process states of cloud applications to a set of data stores. The ReLoC system works on the architectural tenet of cloud like loosely coupled tiers and services and message-oriented asynchronous communication. In one embodiment, the ReLoC system employs Rabbit MQ™ which is a scalable message queuing framework. The ReLoC system enforces loose coupling of the different application elements to provide resilience and uses an abstraction (Hash Table) on top of a database (DB) which allows for multiplexing DB ports (e.g., multiple concurrent reads and writes to one or more databases). The ReLoC system also provides parameterized state persistence policy configurations for reduced resource blocking. The ReLoC system provides higher capacity by reducing resource blocking, and higher resiliency by using loose coupling and asynchronous communications.

Centralized and distributed approaches may be used for state management. In distributed approaches, application instances store session and process states locally (e.g., written to local disks or files) and sharing of states across these local stores happen through network communication. These distributed approaches are fraught with synchronization and consistency challenges. To use the distributed approaches, the applications (or software containers that host applications) need to be "aware" (e.g., in the sense that the applications may require strong clustering and consistency semantics). Examples of distributed state management approaches include: Tempest, SSM, Terracotta Ehcache and Gemfire. Centralized approaches may employ a globally accessible DB store. Application instances push states into and read states from the global store. Such centralized approaches traditionally run into scalability and availability challenges because of dependence on a single DB. An example centralized approach includes Tomcat™ session persistence. In the context of cloud computing, creating centralized or distributed forms of clustering and state management solutions are typically easier on Infrastructure as a service (IaaS) implementation because of the ability to control the entire technology stack. The concept of clustering is not always available on PaaS Clouds. For example, popular PaaS Clouds such as CloudFoundry and Amazon® Elastic Beanstalk do not currently have any state management approaches.

The ReLoC system provides a decoupled message-oriented approach to save and propagate session state in a PaaS environment. The ReLoC system utilizes a message queue (e.g., RabbitMQ™) to make the communications scalable. The message queuing framework may be provided by PaaS providers. The ReLoC system enforces loose coupling of the different backend elements to provide resilience and uses an abstraction (Hash Table) on top of the database (DB) which allows for multiplexing DB ports and provides flexibility in configuring state persistence policies, for reduced resource blocking and/or contention. A Handler Agent (e.g., a software daemon) handles incoming requests to one or more assigned applications and the Handler Agent is responsible for holding requests while requests are routed via the message queue (MQ) to the respective applications (e.g., application instances via the application agents in communications with the handler agent) where one or more application agents service the requests. A Hash Table agent (e.g., database agent) is responsible for multiplexing communication to the database (e.g., a hash table) and interacts with the worker agent via the MQ. The ReLoC system provides user state management on PaaS clouds, and using the ReLoC system, while designing an application's architecture, ensures higher capacity, reduced resource blocking and higher resiliency by using loose coupling and asynchronous communication.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
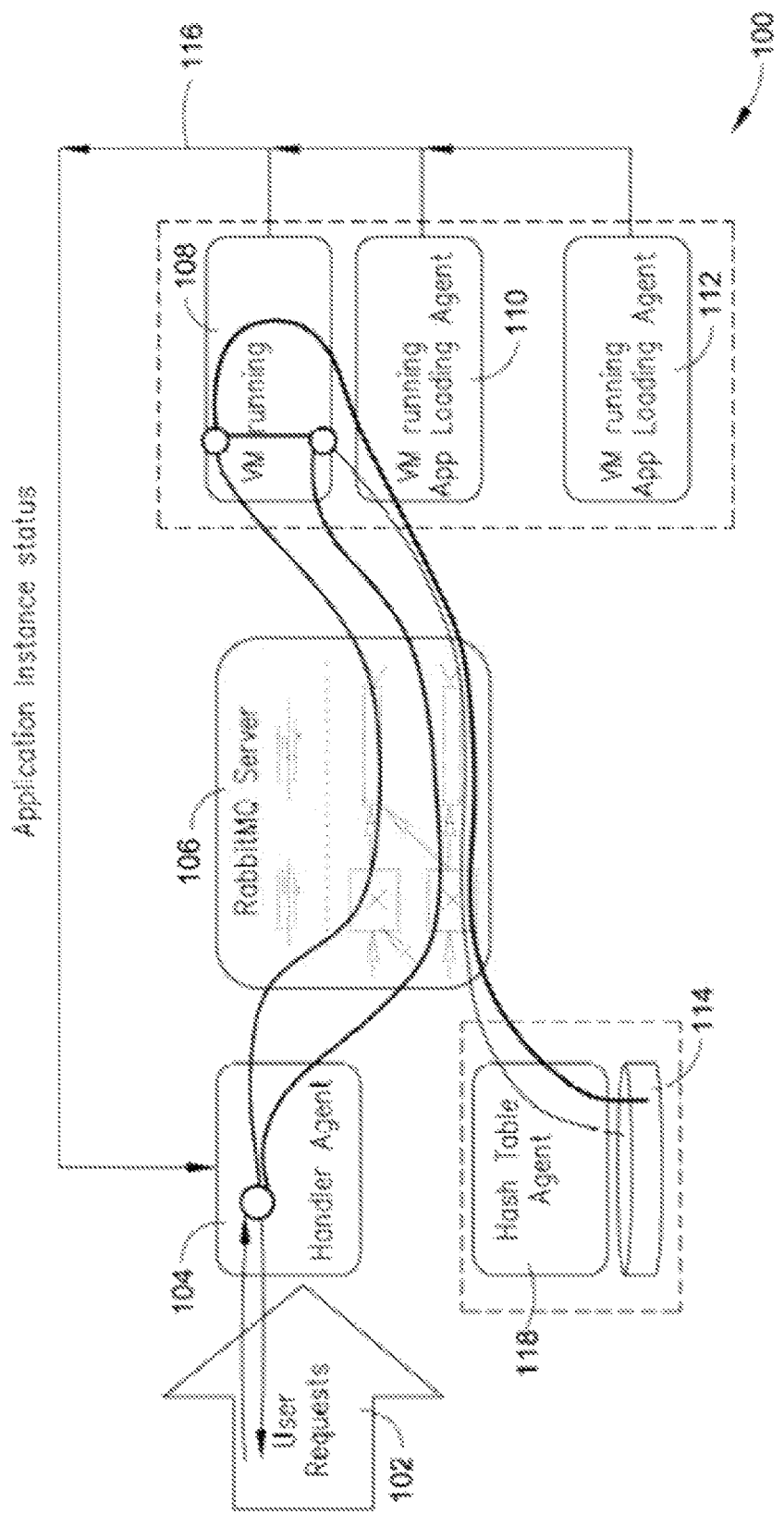
FIG. 1 is a block diagram of the internal interactions of the REsilient LOosely Coupled (ReLoC) system.

The REsilient LOosely Coupled (ReLoC) architecture relates to a system and method, generally referred to as a system for managing user state for applications deployed on platform-as-a-service (PaaS) clouds, and more particularly, but not exclusively, to a session-state management architecture for PaaS clouds that uses loosely-coupled services and platform agnostic scalable messaging technology to propagate and save session states. The ReLoC architecture provides a user session management system and method to maintain session state in a resilient manner in the cloud environment. PaaS cloud infrastructures are prone to sudden failures (e.g., system component outages and/or degradation in service in the infrastructure) for which the ReLoC system provides "stable" user sessions and user session management. The ReLoC system defines session state as a set of object variables that identify (i) user context, (ii) application context, and (iii) environment variables within a session boundary. The session state may include session data and user data which are currently updated. The ReLoC application architecture is a robust and highly scalable user session management system which can be deployed on a variety of different PaaS platforms. The ReLoC system provides a way to maintain a stable user session even if the application instance handling that session goes down (e.g., failover happens transparently for the end user). The framework scales well under heavy load conditions in the cloud.

The ReLoC system comprises one or more memories including a first memory couple to a processor, the first memory comprising a handler agent. The handler agent includes a user interface configured to receive a session object request that identifies a session object, and communicate a session object response that identifies a response to the session object request. The first memory or another memory may include handler agent logic that communicates, via a message queue, with application instances accessible through application agents in communication with the handler agent. The handler agent logic determines one or more of the application agents to which to forward the session object request, and forwards the message queue message to the determined one or more application agents in order to service the request. The first memory or another memory may also include a hash table agent comprising a second memory (e.g., a cache or local memory or some other memory). The hash table agent is configured to identify a hash-mapped key-value that identifies at least one location, including the first memory or the second memory or both, to store or retrieve a session object and state of the session object. The first memory or another memory may further include application agents logic configured to receive the session object request from the handler agent, communicate a request for session object state of the session object to the hash table agent, and receive the session object and the session object state from the hash table agent. The application agents logic services the session object request, using the application instances accessible through application agents, based on the requested session object state to obtain a session object request result. The application agents logic communicates an updated session object state and the session object request result to the hash table agent, and communicates the session object response to the handler agent based on the session object request result. The one or more application agents send to the hash table agent, via the message queue, a message queue message that identifies the session object, and receive from the hash table agent a message with the session object and session object state.

The application agents logic is further configured to read the session object request, de-serialize the session object and read the session object value in order to update the session object state or the application context or both. Serialization may be performed by the application agents logic which converts one or more data structures or object states into a format that can be stored (e.g., in a file and/or memory buffer), or transmitted across a network connection link and de-serialized (e.g., "resurrected" from one or more storage locations) in the same or another computer environment. The serialization performed by application agents logic is supported natively in Java® which allows transfer of a particular java object from one machine (e.g., processor) to another in an environment. The serialization transfers HTTP objects as well as data objects which contain session information across machines (e.g., processor) in the environment. The ReLoC system embeds the serialized data in RabbitMQ® messages in the communications, as describe below.

The Hash Table Agent mediates database reads and writes for storing and retrieving session objects and session object states (e.g., application state or context and/or user session state). The session object request may be a HTTP request object, and the session object response may be a HTTP response object. The application agents communicate availability status of the application instances to the handler agent via another message queue message comprising the availability status. The handler agent, application agents, and hash table agent subscribe to the message queue to communicate with each other. The hash table agent uses the session object request to generate a hash-mapped key-value that identifies the at least one location to store the session object in a Key-value store Hash Table, when the session object request is a request to store the session object. The hash table agent uses the session object request to generate another hash-mapped key-value that identifies the at least one location from which to retrieve the session object from a Key-value store Hash Table, when the session object request is a request to retrieve the session object. The handler agent logic is further configured to receive from the application instances availability information for the application instances available to service the session object request, where the application agents communicate availability status of the application instances to the handler agent via another message queue message. The handler agent logic is further configured to wrap the session object request in a message queue message, and serialize the session object using standard Java serialization.

The ReLoC system implements mechanisms to achieve scalability and resiliency. First, the propagation of session state across various loosely coupled layers of application is achieved asynchronously through a message queuing backbone. Hence, the propagated "session context" is saved in the durable message queue even if the sender or receiver goes down. Most PaaS providers support queue-based messaging services. Architects have used enterprise messaging middleware capabilities for managing distributed transactions. The ReLoC system employs a message queuing backbone to enable session state management across loosely coupled service tiers in PaaS clouds. Current messaging protocols, especially emerging Advance Message Queuing Protocol (AMQP) provides scalable, durable and interoperable brokering mechanism for generating and consuming asynchronous message payload between a set of clients. Prominent PaaS cloud providers, such as CloudFoundry from VMware support scalable open-source implementation of AMQP called Rabbit MQ.

Second, in order to cut down synchronization chatter across peer application instances, the ReLoC system stores session states in centralized shared database. Consistency in a PaaS environment manages different instances of the same application running in different containers (serving concurrent users), unaware of each other instances' presence and so there is no obvious way in which database requests originating from these instances can be 'pooled'. So any update to shared data across user sessions which causes database reads and writes should also get multiplexed and de-multiplexed to and from the database respectively. The ReLoC system uses a key-value data structure on top of the data stores such as MySQL associated with a queue listener. In this way, messages containing session states from multiple ReLoC Application containers can quickly be mapped to key-value objects for persistence, which avoids costly DB connections (and resource blocking) across tiers and facilitates flexible persistence policies.

FIG. 1 is a block diagram 100 of the internal interactions of the ReLoC system. A user interacts (e.g., user requests 102 and/or session object requests) with an application through a user interface in communication with one or more Handler Agents 104. The Handler Agent 104 may spawn a thread (e.g., computing or processing thread) that acts as a proxy. The Handler Agent 104 forwards the user request 102 in a message queue message through a message queue 106 to one or more application agents, which subscribe to the message queue 106 (e.g., one or more Rabbit MQ™ servers), in communication with one or more application instances (108, 110, and 112) that service the request. The one or more application agents and the application instances (108, 110, and 112) may run on one or more virtual machines (VM). The message queue 106 exchanges, routes and filters messages, queues, stores and forwards messages to subscribers (e.g. HA, AA, and HTA). The application (e.g., application instances 108, 110, and 112) receives the request and communicates with the Hash Table Agent 118 through the message queue 106, and the Hash Table Agent 118 fetches the session object and session object state from the Hash Table 114. The Hash Table Agent 118 may be configured as a cache as well as a multiplexer for database persistence. The Application (e.g., one or more application instances 108, 110, and 112) proceeds with servicing the session object request. The Application (e.g., one or more application instances 108, 110, and 112) communicates the availability status 116 to the Handler Agent 104. The Application (e.g., one or more application instances 108, 110, and 112) pushes the processed result onto the message queue 106 and updates the session state at the hash table 114. The user is sent a reply (e.g., session object response) through the HA 104.

The ReLoC system may implement Java supported by popular PaaS Cloud platforms. The ReLoC system may include a Handler Agent (HA); an Application Agent (AA); a Hash Table Agent (HTA); and a RabbitMQ Server (MQ). The Handler Agent provides an interface to the end user. Further, Handler Agent may perform as a load balancer for routing the incoming requests to the Application Agents. The Handler agent also performs as a failure mitigator in case an AA fails while serving a request. The HA may be implemented as a HTTP proxy servlet that waits for requests (e.g., session object requests) from the user. Handler Agent maintains the availability information of application instances through the AAs. When a new user request is received, the HA forwards the request to the most suited Application Agent. In doing so, Handler Agent also listens to a heartbeat from the respective AAs. If there is a timeout (e.g., there is no heartbeat after a configurable period of time), Handler Agent goes into failure mitigation mode and replays the request to other available instances.

The "Handler Agent" (HA) binds a user (browser) request to an application end-point. The user requests arriving at the web application expect synchronous replies to the requests. While the handler agent can be thought of as a proxy (e.g., a typical HTTP servlet handler), the handler agent functions differently than a typical proxy. The handler agent spawns a thread for each user request which holds the request. The handler agent extracts the input payload from the request and creates an MQ message. The handler agent looks for an available application instance to which to route the message, and puts the routing information in MQ message header. To know the available Application instances, the handler agent employs a heartbeat mechanism and does load balancing in a round-robin manner, or another load balancing approach may be used. The handler agent can co-locate with the request router module of the PaaS platform. If the request routers are clustered, the handler agent can make use of this clustering mechanism.

The communication between HA and AA is through MQ messages. The HA may implement the RabbitMQ client functionality. The HTTP request objects are serialized using standard Java serialization and sent after wrapping the HTTP request objects as MQ messages. The HA also acts as a receiver for the reply messages from the AAs. In one implementation, because of constraints on the hardware allocated for deploying Rabbit MQ simple HTTP request objects may be forwarded between the HA and the AAs.

The ReLoC system includes one or more Application Agents (AA) which may be located with the one or more application instances in a container and the one or more Application Agents are responsible for state management related functionality for the one or more application instances. The AA subscribes to the MQ (e.g., Rabbit MQ) and whenever a message designated for an application instance arrives, the AA picks up the message and extracts the input for the instance to work with. Where the application instance is invoked for the first time in a session, or the previous session has expired, the AA is responsible for fetching the previous persisted state data from the database. As per the configurable session persistent policy, AA communicates the current session state to the database. State related database communications are routed through the MQ to achieve asynchrony and loose-coupling. The response from the application is also communicated to the MQ, which is then extracted by one or more designated handler agent and sent back to the user. The session is deleted from the queue after the response is served. The AA also sends heartbeat messages to the handler agent periodically at configurable intervals; useful for failure mitigation.

The one or more Application Agents may run in a Tomcat™ container running in separate machines in separate JVMs. The Application Agent may perform as a communication interface to the running application instance. The AA is responsible for receiving and sending session messages via MQ to communicate with the HA and HTA and delegating the session context to the WebApp in Tomcat. When a user request that is bound for service at this application instance is received, the Application Agent pulls the state for that user from the database via the HTA and thereafter uses that information for processing the request. The Application Agent also sends "IsAlive" heartbeat messages to HA.

When AA sends a session object to be persisted (e.g., stored in the database), the AA may send the session object using standard Java serialization and create a MQ message routed for a suitable HTA. A particular field is identified in the MQ message which identifies the HTA that the session object is identified to persist the session object. On the other hand, if the AA wants to retrieve a stored session object from the database, the AA sends a message to HTA via MQ with an identifier (the user ID) for the session object to be retrieved. In response, the AA receives a message with the serialized Java session object the AA requested. The AA reads the session object, de-serializes the session object and reads the values to update the context.

The Hash Table Agent (HTA) mediates the database reads and writes for storing and retrieving session objects. HTA may perform as a client to the MQ, pulling any message directed for the HTA. Upon receiving a message, the HTA extracts the session object from the session object request and caches the session object in a Key-value store (Hash Table) in the local memory of the HTA. A user may specify how often the session object structure is persisted in the database (e.g., MySQL) using a persistence threshold value that represents the elapsed time between which the HTA stores the session object structure. A user may define either the number of objects or the time interval after which, the HTA to bulk insert the latest of the objects to the DB. A user may also configure the number of concurrent local JDBC connections that the HTA maintains with the database, depending on how many different threads are spawned to process the incoming requests. The Hash Table Agent may provide a multiplexing feature used to bunch together (e.g., aggregate) many different database requests from different application instances onto individual connections from the pool Hash Table Agent holds with the database, thus eliminating, avoiding, and/or reducing contentions. When HTA receives a request to retrieve a session object, the HTA may retrieve and/or receive the latest copy of the serialized object, wrap the session object request as a MQ message and dispatch the MQ message to the requesting AA. If there is no cached copy of the session object, HTA retrieves the session object from the database, caches a copy of the session object and sends the serialized session object to the requesting AA.

The ReLoC system may be deployed with cloud providers that support data services like MySQL or MongoDB that provide quick insertions and lookups of key-value record sets to be used for persistence of states. The ReLoC system employs a fast and scalable persistence mechanism that persists session data in the database and does create bottlenecks. Maintaining direct database connections across application and data tiers may be costly and error-prone. The ReLoC system and/or the Hash Table Agent generates a hash-mapped key-value structure in the database for effective state persistence and retrieval. The access to database is mediated through a wrapper called HTA or the Hash Table Agent. The Hash Table Agent listens to the MQ, and upon receiving a session object request that identifies a session object update or retrieval request from the queue, quickly inserts, maps or updates session objects in the table(s). The Hash Table Agent interacts with underlying database through optimized local JDBC connections. The Hash Table Agent may perform as a multiplexer and pool incoming requests from different containers and bunch requests to the underlying database. The ReLoC system may implement "write behind" strategies (e.g., caching, bunching and bulk insertion). Depending on the load profile, the ReLoC system may enforce different caching strategies at the HTAs to enable smooth performance. If the databases are clustered, HTAs can make use of this mechanism.

Figure 2:
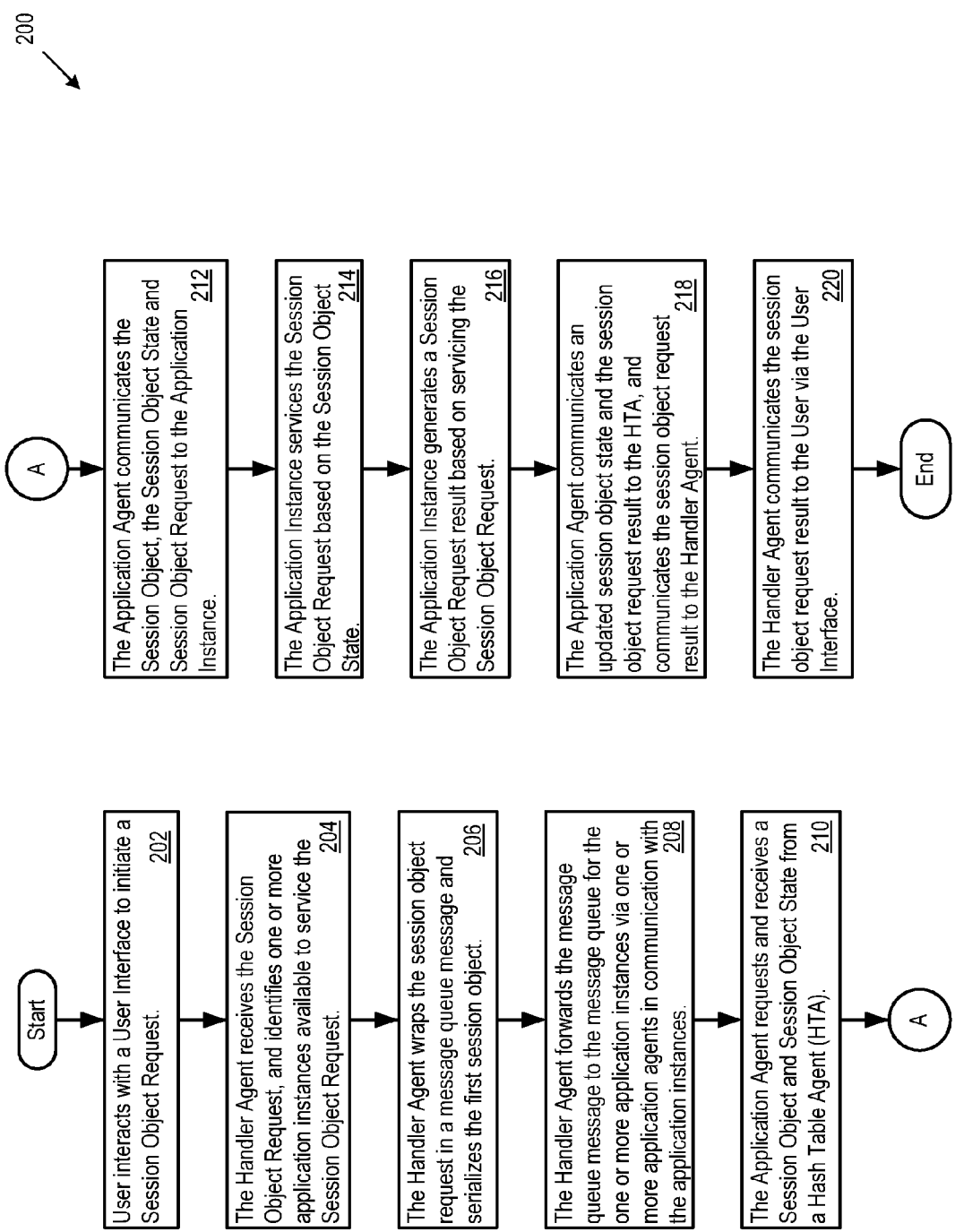
FIG. 2 is a flowchart illustrating the logic instructions the ReLoC system may execute to maintain the user session state.

FIG. 2 is a flowchart 200 illustrating the logic instructions the ReLoC system may execute to maintain a user session state. The user interacts with a User Interface to initiate a Session Object Request (202). The Handler Agent receives the Session Object Request, and identifies one or more application instances available to service the Session Object Request (204). The Handler Agent wraps the session object request in a message queue message and serializes the first session object (206). The Handler Agent forwards the message queue message to the message queue for the one or more application instances via one or more application agents in communication with the application instances (208). The Application Agent requests and receives a Session Object and Session Object State from a Hash Table Agent (HTA) (210). The Application Agent communicates the Session Object, the Session Object State and Session Object Request to the Application Instance (212). The Application Instance services the Session Object Request based on the Session Object State (214). The Application Instance generates a Session Object Request result based on servicing the Session Object Request (216). The Application Agent communicates an updated session object state and the session object request result to the HTA, and communicates the session object request result to the Handler Agent (218). The Handler Agent communicates the session object request result to the User via the User Interface (220).

Figure 3:
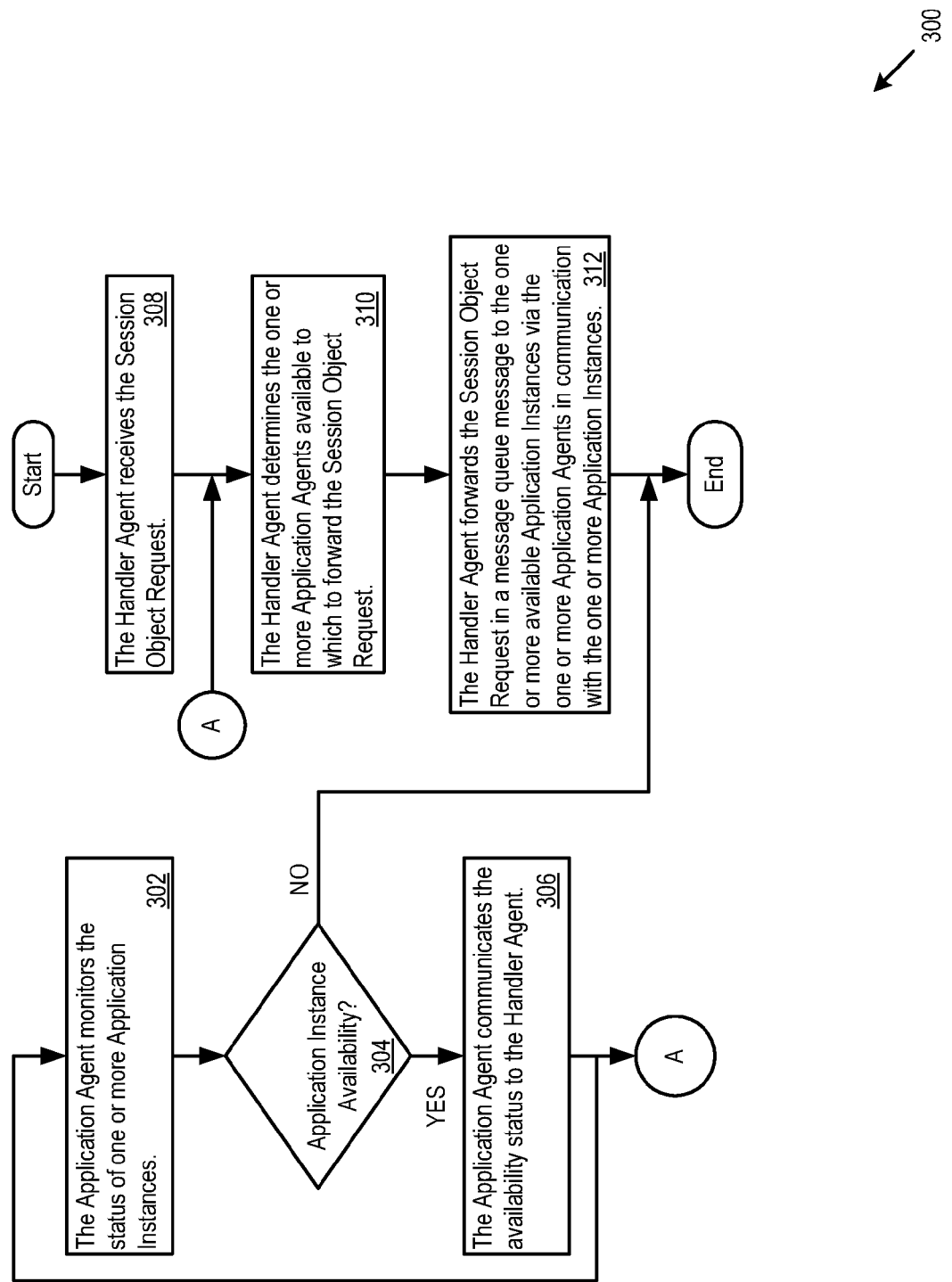
FIG. 3 is a flowchart illustrating the logic instructions the ReLoC system may execute to determine the application agent to service a session object request.

FIG. 3 is a flowchart 300 illustrating the logic instructions the ReLoC system may execute to determine the application agent (e.g., application instance) to service a session object request (e.g., user request). The Application Agent monitors the status of one or more Application Instances (302), and communicates the status of one or more Application Instances to a subscribing Handler Agent 104 (304, 306). When the Handler Agent 104 receives the Session Object Request (308), the Handler Agent 104 determines the one or more Application Agents available to which to forward the Session Object Request (310). The Handler Agent forwards the Session Object Request in a message queue message to the one or more available Application Instances via the one or more Application Agents in communication with the one or more Application Instances (312).

Figure 4:
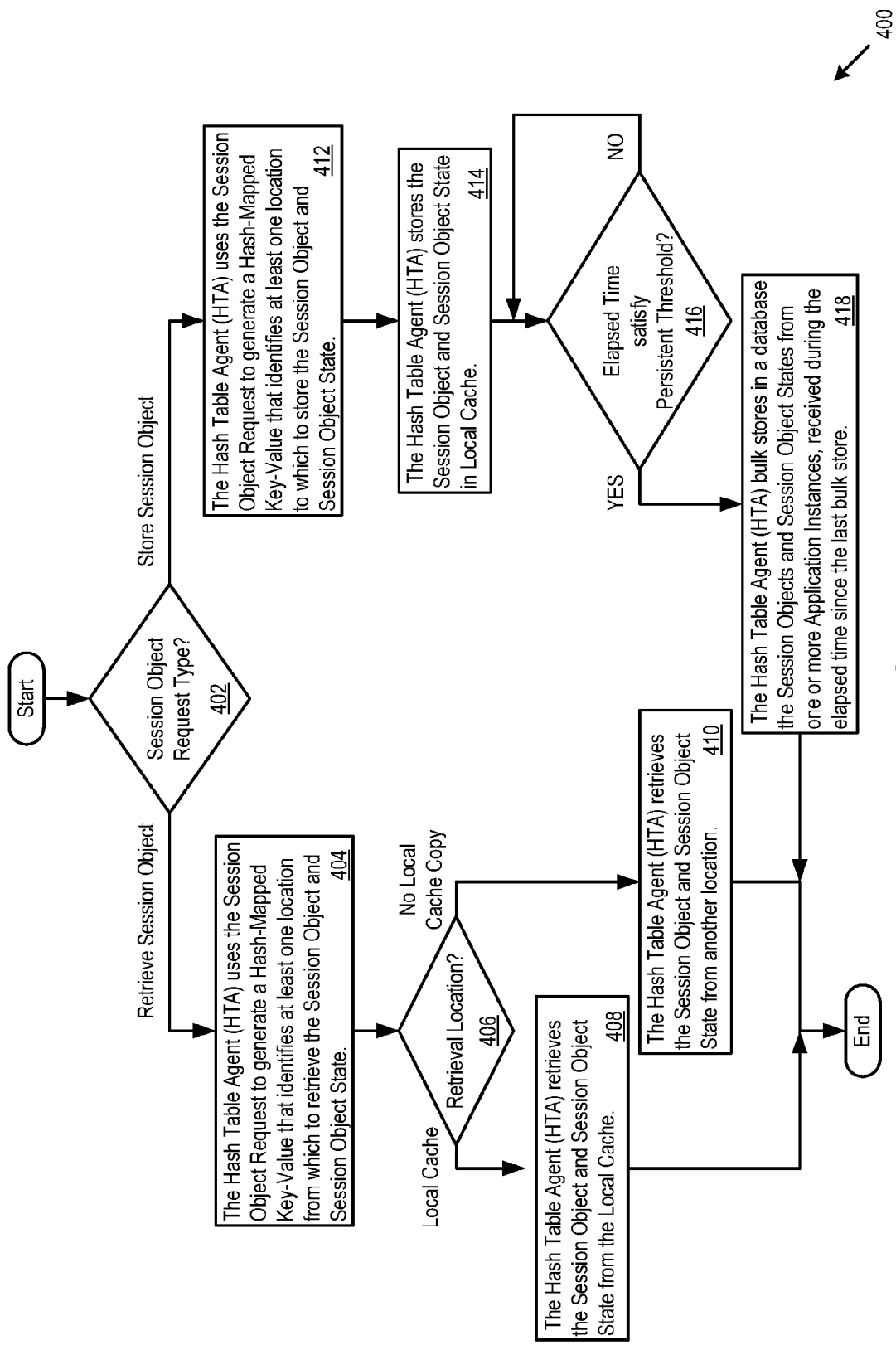
FIG. 4 is a flowchart illustrating the logic instructions the ReLoC system may execute to operate the Hash Table Agent (HTA).

FIG. 4 is a flowchart 400 illustrating the logic instructions the ReLoC system may execute to operate the Hash Table Agent (HTA). The Hash Table Agent (HTA) determines whether the session object request is a request to retrieve a session object or store a session object (402). When the session object request is a request to retrieve a session object, the Hash Table Agent (HTA) uses the Session Object Request to generate a Hash-Mapped Key-Value that identifies at least one location from which to retrieve the Session Object and Session Object State (404). In one implementation, the Hash Table Agent (HTA) may extract the Hash-Mapped Key-Value from the Session Object Request. The Hash Table Agent (HTA) searches the local cache for a copy of the Session Object and Session Object State (406, 408). In the event a copy of the Session Object and Session Object State is not located in the local cache, the Hash Table Agent (HTA) retrieves the Session Object and Session Object State from another location (e.g., one or more databases) (410).

When the session object request is a request to store a session object, the Hash Table Agent (HTA) uses the Session Object Request to generate a Hash-Mapped Key-Value that identifies at least one location to which to store the Session Object and Session Object State (412). The Hash Table Agent (HTA) may store the Session Object and Session Object State in local cache (e.g., local memory of the Hash Table Agent (HTA)) (414) for faster and/or more efficient processing time. The Hash Table Agent (HTA) may also determine whether the elapsed time since the last storage operation was executed satisfies a configurable persistent threshold (416). The Hash Table Agent (HTA) may bulk store, in a memory and/or database, the Session Objects and Session Object States from one or more Application Instances, received during the elapsed time since the last bulk store (418).

Figure 5:
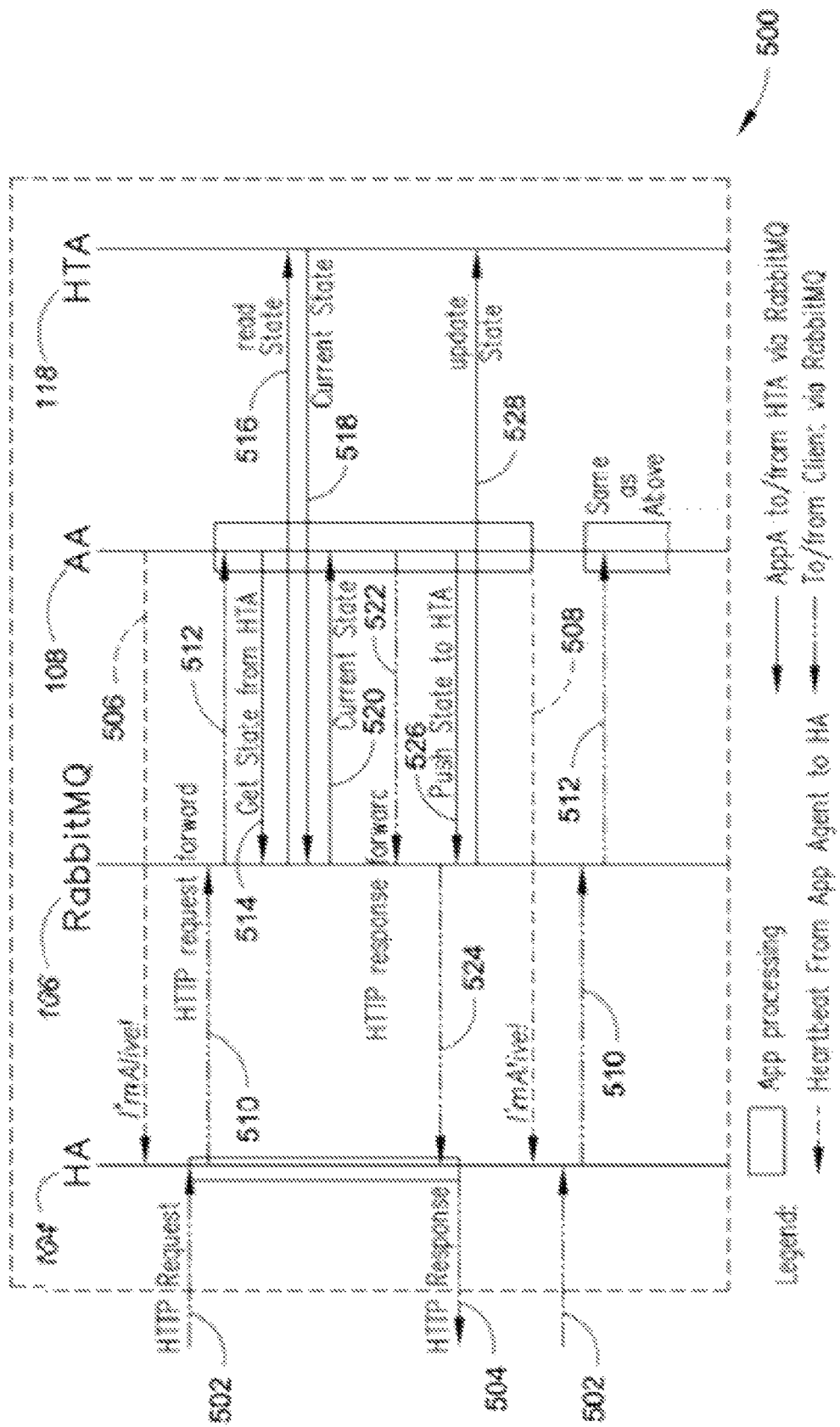
FIG. 5 shows a swim-lane diagram of ReLoC internal communications for session handling for a typical user interaction.

FIG. 5 shows a swim-lane diagram 500 of ReLoC internal communications for session handling for a typical user interaction. From the user's end, the internal communication is hidden from the user and the communications (e.g., session object requests) may be processed as normal HTTP requests 502 and HTTP responses 504. If the application instance (108, 110, 112) that is handling the user requests fails, the user request is not lost and the user does not get an error message, because the session context (e.g., application context and/or session object state) resides in the persistent queue 106 (e.g., Rabbit MQ™) and/or in the key-value store (e.g., Hash table 114 in a local cache), and the session context may not be co-located with the serving application instances (108, 110, 112) in order to provide greater fault tolerance. The application instance 108 communicates availability status (506, 508) to the HA 104 from which the HA determines the one or more application instances (108, 110, 112) to forward a session object request 510 (e.g., normal HTTP requests 502). The application instance 108 subscribes to the message queue 106 to receive the session object request 512 (e.g., normal HTTP requests 502). The application instance 108 communicates a request 514 for the session object and session object state to the HTA 118. The HTA 118 also subscribes to the message queue 106 to receive the session object requests 516. The HTA 118 communicates the session object state 518 and the application instance 108 receives session object state 520 (e.g., current application state and/or user session state). The application instance 108 services the session object request 512 and communicates a session object request result 522 (e.g., HTTP response 504) to the message queue 106, and the HA 104 receives the session object request result 524 and communicates the same to the user via the HTTP response 504. Once the application instance 108 services the session object request 512, the application instance 108 communicates the application state 526 (e.g., session object state, user session state and/or application context) to the message queue and the HTA 118 receives the application state 528.

Table 1 shows the format of typical message queue (e.g., RabbitMQ™) messages exchanged among the various components of the system.

TABLE 1

Formats of the message queue

General Format of RabbitMQ Messages

<RabbitMQMessage>
<Source> 'AppAgent23' </Source>
<Destination> 'HTAgent1'< Destination >
<TimeStamp> '20110914105955663000'</ TimeStamp>
<Data>...</ Data>
</RabbitMQMessge>

Message Payload between Application Agent & HashTable Agent

<Data>
<Action>'Save<Action>
<AppName>'PetStore'</AppName>
<ClientID>'Client1093'</ClientID>
<SerializedSessionData>...</ SerializedSessionData >
</Data>

Message Payload between Application Agent & Handler Agent

<Data>
<SerializedHTTPRequest>...</ SerializedHTTPRequest >
<SerializedHTTPResponse>...</ SerializedHTTPResponse>
</Data>

Figure 6:
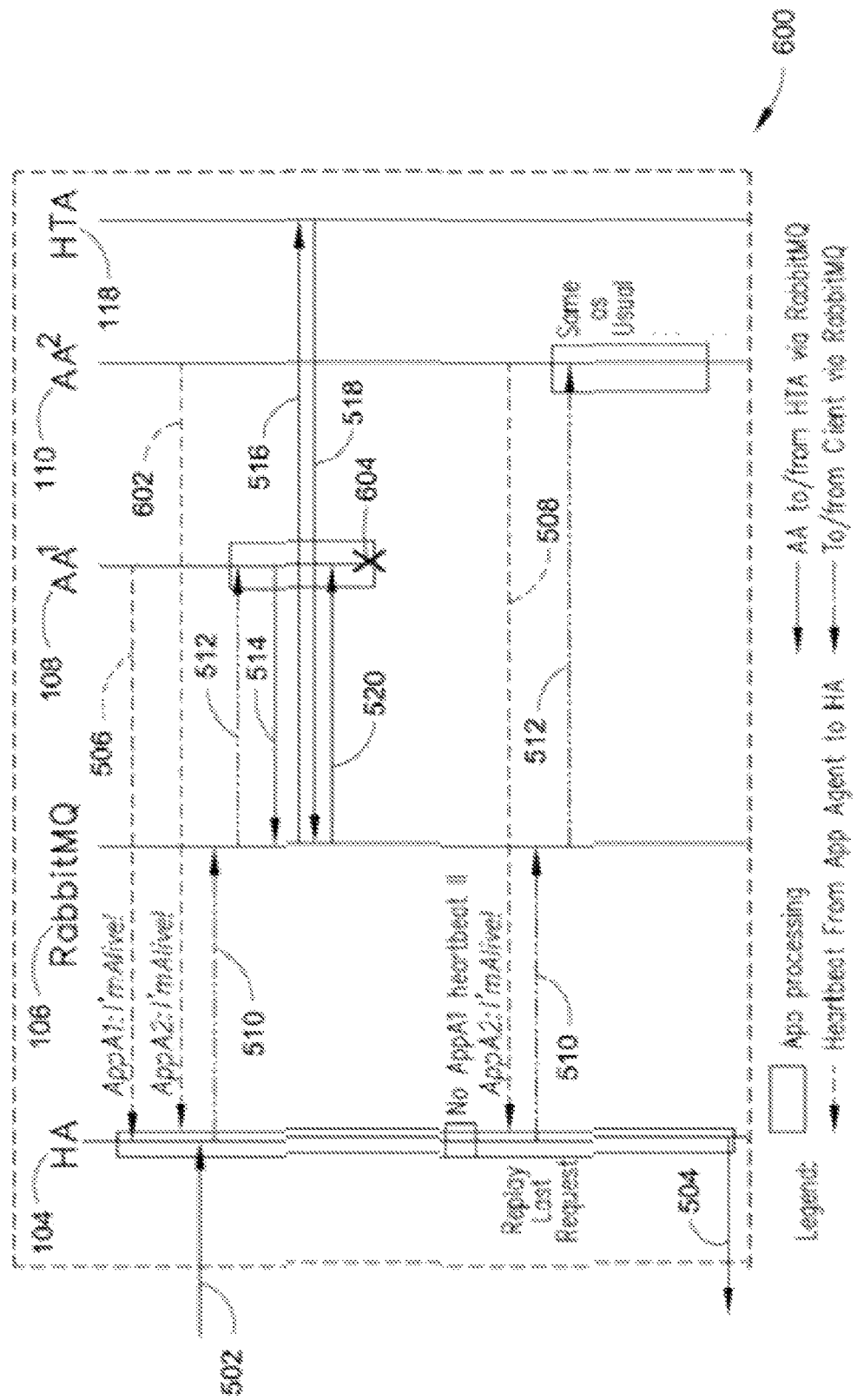
FIG. 6 shows a swim-lane diagram of ReLoC internal communications for session handling when an execution container goes down.

FIG. 6 shows a swim-lane diagram 600 of ReLoC internal communications for session handling when an execution container (e.g., application instance) goes down. If an execution container goes down 604, the application instance and the application agent (AA) 108 also fail and the heartbeat message (e.g., availability status) is not sent to the HA. When the HA does not receive the heartbeat for a defined period of time, the HA goes into a failure mitigation state (e.g., mode of operation). The HA chooses an alive (e.g., available status 602) and available application instance 110 from a set of application instances and then resends the user request 502 which the HA is holding, to the available application instance 110 via the message queue 106. An increased response time for a request may result from servicing a request when alternative application agents and/or application instances must be used because one or more of the application agents and/or application instances become unavailable while attempting to service the request.

Figure 7:
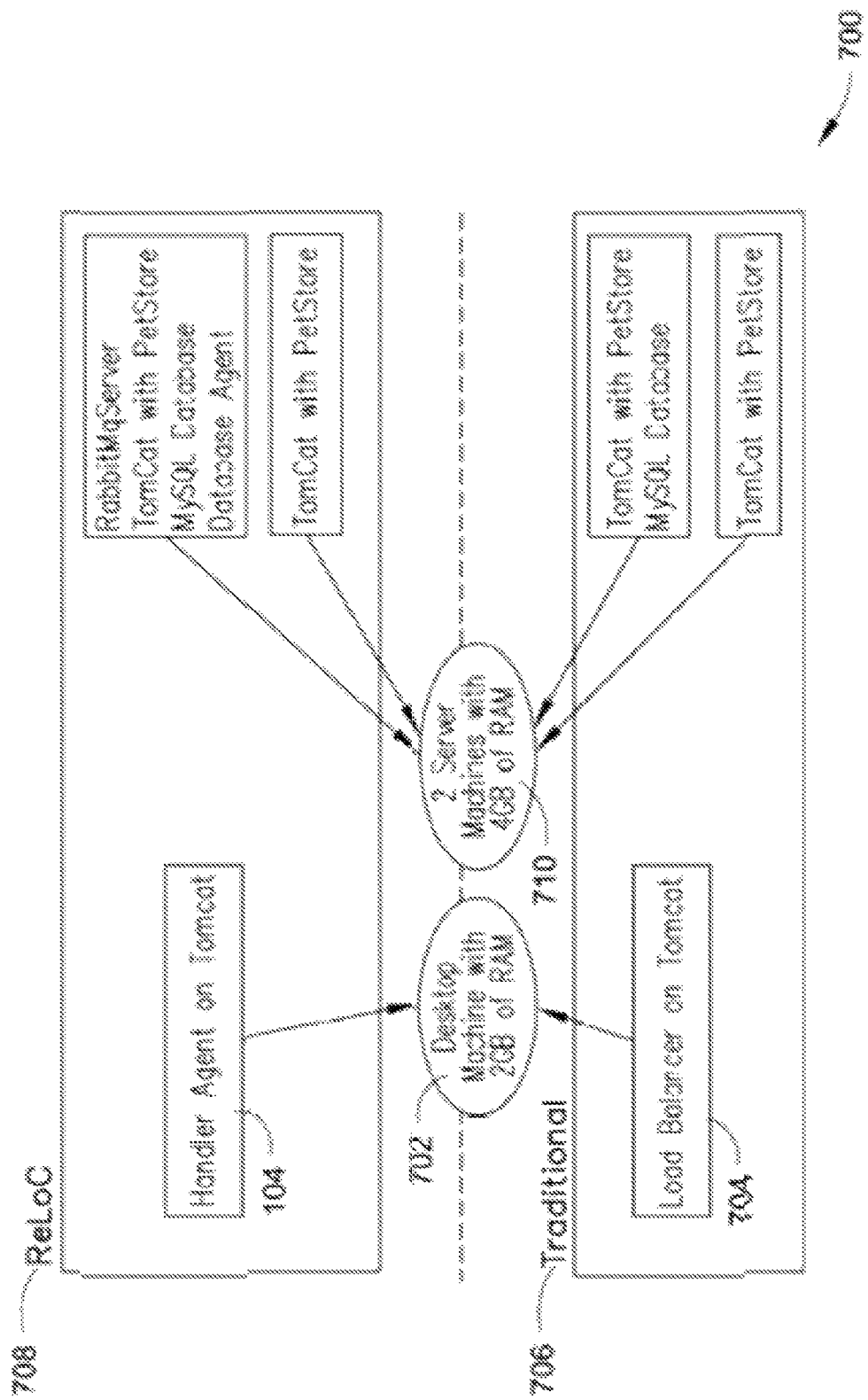
FIG. 7 illustrates a deployment architecture machine hardware configuration.

FIG. 7 illustrates a deployment architecture 700 machine hardware configuration. The ReLoC system may implement server grade machines, including a machine 702 to run a Load balancer 704 (Traditional Case 706) or the Handler Agent 104 (ReLoC 708), and two machines 710 with Tomcat™ which may run the application instances (108, 110, 112), the MySQL database, host the message queue (e.g., RabbitMQ™) server and the HashTable Agent. The server grade machines may run Ubuntu 10.04 as the base operating system and use Tomcat™. The ReLoC system may typically be deployed on private or public Cloud infrastructures.

In order to preserve the application state, the application stack (e.g., heap, threads and class files) may be serialized and perform periodic checkpoints, the captured state can then be re-instated or replayed back in the event of failure. With the advent of virtual machine technology, checkpointing is done relatively faster through the virtual machine (VM) snapshot. In case of long running applications, tied to a single physical or virtual machine, the state may be encapsulated by a single execution container. In case of distributed computing, however, the execution may be split across multiple machines and one or more of the machines may fail at any time, thereby jeopardizing the state of the entire application. When an external user interacts with the system (as in the case of multi-tier Web based systems), the state is viewed in the context of the session (time period) for which the user interacts with the system. If the user session is associated with an atomic transaction (e.g., all or none) which typically involves creation, update or deletion of critical data (e.g., financial data), then the session context becomes a transactional context and the components of the Web system that participate in the transactional context execute a protocol similar to 2-phase commit. The scenario demands extreme high-availability (e.g., order of six nines) of servers and extremely low failover threshold.

The ReLoC system implements various layers such as Web (or user request handling) tier, Application (business logic execution) tier and database (state and data persistence) tier, typically present in canonical n-tier applications into loosely coupled components. The state management agents residing in these components maintain and propagate state by asynchronous communication through scalable messaging middleware. In this way, the architecture may tolerate node failures at the web or application layer and the state can be re-constituted from the last persisted state at the DB layer. Additionally, as the components communicate asynchronously through messages, the ReLOC system does not impose any requirements of synchronous point-to-point communication across tiers (e.g., database clustering). The loose coupling of the ReLOC system provides application fail-over transparently to end user even within the same user session.

For an application instance that is bounded by a single physical or virtual machine, the machine image consists of application run-time such as the memory allocated (heap and stack) to objects and data, and the context in which the instance is running, including environmental variables, constitute the state of the system. The state of the application may be entirely local, and in event of failure, many of the services for the system can be restarted or resumed in an idempotent manner by restarting the affected node (for stateless instances), or migrating the workload to another node with or without check pointing (for long-running instances). Therefore, failures are localized without affecting the global state of the entire system. Idempotence is the property of certain operations in mathematics and computer science that may be applied multiple times without changing the result beyond the initial application. Implementations of core n-tier enterprise grade Web applications, such as On Line Transaction Processing (OLTP) applications, and persistence and communication heavy processes (such as Business Process Management), deployed natively on cloud platforms are dependent on capturing, propagating and maintaining user session states in global application or transactional context, and failure of any of the nodes along the transactional path affect the global state of the application (thereby requiring recreation of the entire session context, and in some cases, to reverse the transactions). State management for n-tier enterprise grade Web applications may be provided for at least two types of applications: case 1—an Internet banking application, where thousands of debit/credit postings are happening per minute; and case 2—an online retailer, where a client can browse through the catalogue and put items into the shopping cart.

In case 1, the transactional semantics may be really tight. Transaction semantics describe the type of consistency required for data in the transaction. The term "tight semantic" describes a strong consistency model for the underlying transaction data across concurrent read and write processes on the data. A conversational consistency or soft state model may ensure that the process of writing on the data includes a consistent view of the state (across invocations) in a session, while other processes may or may not also view the updated data. The other processes may eventually see the updated data (e.g., after an inconsistency period). A transaction with atomicity (e.g., all or none of a transaction) in a transactional boundary ensures that transaction context is guaranteed (e.g., atomicity in an entire transactional boundary or atomicity in an error threshold portion thereof). The ReLoC system stores the state (e.g., the state may be written to one or more durable storage locations). In case 2, the user can tolerate temporary loss of state (or availability) when the user is browsing the items, although the system may ideally ensure that the user session does not get disrupted by failure in a node or process so that the user receives a seamless experience. In both scenarios, maintaining the state of sessions across user invocations is important, which may be referred to as "soft" state or "conversational" state. In the case 1, the state must never be lost and one appropriate application container is always available in "active" mode holding the session state (e.g., done through high-availability clustering). In case 2, while preserving the state across the user sessions is an ideal goal, in the event of node failure, a user can tolerate some disruption and the state can be re-constructed from a last preserved state. The relevant data for the session state is ephemeral and is kept alive for a user session and may not need durable storage all the time.

In distributed system implementations, a session state is temporarily written in the local cache or disk of a node (with an expiration bound). To guard against failure of local nodes, the session state is replicated across sister nodes. In another implementation approach, the session state is preserved in a centralized and shared durable storage where the participating nodes can write to and read from. High available enterprise systems rely on expensive hybrid approaches to maintain states and the configurations of mid-tier infrastructural components (at the application server layer) also explicitly tweaked to achieve clustering and state management in a scalable manner.

The cloud-ready architectural framework called ReLoC (Resilient Loosely Coupled Application Architecture for Cloud) encapsulates various layers such as Web (or user request handling) database tier, Application (business logic execution) tier and database (state and data persistence) tier, typically present in canonical n-tier applications into loosely coupled components. The state management agents residing in these components maintain and propagate state by asynchronous communication through scalable messaging middleware. In this way, the architecture tolerates node failures at the web or application layer and the state can be re-constituted from the last persisted state at the DB layer. Additionally, as the components communicate asynchronously through messages, the system does not impose any requirements of synchronous point-to-point communication across tiers (like database clustering). The loose coupling provides application fail-over transparently to the end user, even within the same user session. The ReLoC system provides scalability (ability to hold concurrent user sessions) and resiliency (ability to sustain user session context in event of node failures) better than traditional approaches, although the round-trip performance for a transaction may deteriorate.

Figure 8:
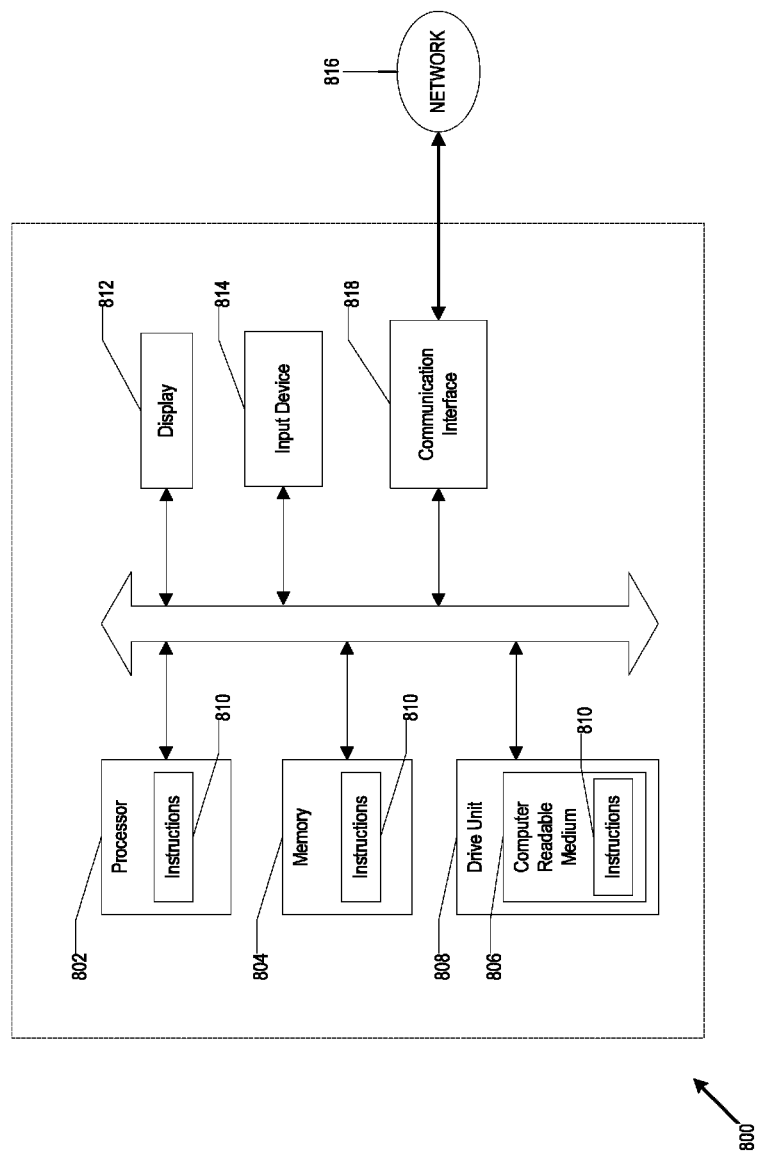
FIG. 8 illustrates a general computer system that may be used to implement the ReLoC system.

FIG. 8 illustrates a general computer system 800, which may represent a service provider server, or any of the other computing devices referenced herein that may be used to provide the ReLoC system and methods. The computer system 800 may include a set of instructions 810 that may be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 810 (sequential or otherwise) that specify actions to be taken by that machine. In a particular embodiment, the computer system 800 may be implemented using electronic devices that provide voice, video or data communication. Further, while a single computer system 800 may be illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, such as, a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus. The memory 804 may be a main memory, a static memory, or a dynamic memory. The memory 804 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 804 may include a cache or random access memory for the processor 802. Alternatively or in addition, the memory 804 may be separate from the processor 802, such as a cache memory of a processor, the system memory, or other memory. The memory 804 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 804 may be operable to store instructions 810 executable by the processor 802. The functions, acts or tasks illustrated in the figures or described herein may be performed by the programmed processor 802 executing the instructions 810 stored in the memory 804. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 800 may further include a display 812, such as a liquid crystal display (LCD), an organic light emitting diode (OLED), a flat panel display, a solid state display, a cathode ray tube (CRT), a projector, a printer or other now known or later developed display device for outputting determined information. The display 812 may act as an interface for the user to see the functioning of the processor 802, or specifically as an interface with the software stored in the memory 804 or in the drive unit 808.

Additionally, the computer system 800 may include an input device 814 configured to allow a user to interact with any of the components of system 800. The input device 814 may be a number pad, a keyboard, or a cursor control device, such as a mouse, or a joystick, touch screen display, remote control or any other device operative to interact with the system 800.

The computer system 800 may also include a disk or optical drive unit 808. The disk drive unit 806 may include a computer-readable medium 806 in which one or more sets of instructions 810, e.g. software, can be embedded. Further, the instructions 810 may perform one or more of the methods or logic as described herein. The instructions 810 may reside completely, or at least partially, within the memory 804 and/or within the processor 802 during execution by the computer system 800. The memory 804 and the processor 802 also may include computer-readable media as discussed above.

The present disclosure contemplates a computer-readable medium 806 that includes instructions 810 or receives and executes instructions 810 responsive to a propagated signal; so that a device connected to a network 816 may communicate voice, video, audio, images or any other data over the network 816. Further, the instructions 810 may be transmitted or received over the network 816 via a communication interface 818. The communication interface 818 may be a part of the processor 802 or may be a separate component. The communication interface 818 may be created in software or may be a physical connection in hardware. The communication interface 818 may be configured to connect with a network, external media, the display 812, or any other components in system 800, or combinations thereof. The connection with the network 816 may be a physical connection, such as a wired Ethernet connection or may be established wirelessly as discussed below. Likewise, the additional connections with other components of the system 800 may be physical connections or may be established wirelessly.

The network 816 may include wired networks, wireless networks, or combinations thereof. The wireless network may be a cellular telephone network, an 802.11, 802.16, 802.20, or WiMax network. Further, the network 816 may be a public network, such as the Internet, a private network, such as an intranet, or combinations thereof, and may utilize a variety of networking protocols now available or later developed including, but not limited to TCP/IP based networking protocols.

The computer-readable medium 806 may be a single medium, or the computer-readable medium 806 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 806 may include a solid-state memory such as a memory card or other package that houses one or more non-volatile read-only memories. The computer-readable medium 806 also may be a random access memory or other volatile re-writable memory. Additionally, the computer-readable medium 806 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A user session management system comprising: a first memory coupled to a processor, the first memory comprising;
   a handler agent executable by the processor supported by a cloud platform comprising: a user interface having a display device that is configured to:
   receive a session object request that identifies a session object; and communicate a session object response that identifies a response to the session object request; and
   handler agent logic executable by the processor supported by the cloud platform that: communicates, via a message queue, with one or more application instances accessible through one or more application agents in communication with the handler agent;
   determines one or more of the application agents to which to forward the session object request; and
   forwards the message queue message to the determined one or more application agents;
   a hash table agent executable by the processor supported by the cloud platform comprising a second memory, where the hash table agent is configured to identify a hash-mapped key-value that identifies at least one location, including the first memory or the second memory or both, to store or retrieve a session object and state of the session object, wherein the hash table agent supported by the cloud platform extracts session object from the session object request and stores the session object cached in the second memory to a database at a user-defined time interval, and retrieves the session object from the database when the session object request is received and the session object is not cached in the second memory, and wherein the hash table agent aggregates a plurality of database requests for a session object corresponding to a first application into a first individual connection to the database related to the first application, and wherein the hash table agent aggregates a plurality of database requests for a session object corresponding to a second application into a second individual connection to the database related to the second application, wherein the first individual connection to the database is separate from the second individual connection to the database, and wherein the hash table agent mediates database reads and writes for storing and retrieving session objects; and application agents logic executable by the processor supported by the cloud platform configured to:

receive the session object request from the handler agent;

communicate a request for session object state of the session object to the hash table agent;

receive the session object and the session object state from the hash table agent; service the session object request, using the one or more application instances accessible through application agents, based on the requested session object state to obtain a session object request result;

communicate an updated session object state and the session object request result to the hash table agent;

communicate the session object response to the handler agent based on the session object request result; and read the session object request, de-serialize the session object and read the session object value in order to update the session object state or the application context or both.

2. The system of claim 1, where the one or more application agents send to the hash table agent, via the message queue, a message queue message that identifies the session object; and the one or more application agents receive from the hash table agent a message with the session object.

3. The system of claim 1, where the session object request is for a HTTP request object, and where the session object response is for a HTTP response object.

4. The system of claim 1, where the one or more application agents communicate availability status of the application instances to the handler agent via another message queue message comprising the availability status.

5. The system of claim 1, where the handler agent, application agents, and hash table agent subscribe to the message queue.

6. The system of claim 1, where the hash table agent uses the session object request to generate a hash-mapped key-value that identifies the at least one location to store the session object in a Key-value store Hash Table, when the session object request is a request to store the session object.

7. The system of claim 1, where the hash table agent uses the session object request to generate another hash-mapped key-value that identifies the at least one location from which to retrieve the session object from a Key-value store Hash Table, when the session object request is a request to retrieve the session object.

8. The system of claim 1, wherein the handler agent logic is further configured to: receive from the application instances availability information for the application instances available to service the session object request, where the application agents communicate availability status of the application instances to the handler agent via another message queue message.

9. The system of claim 1, wherein the handler agent logic is further configured to wrap the session object request in a message queue message, and serialize the session object using standard Java serialization.

10. A method to provide user session management comprising: receiving, using a user interface provided by a handler agent, a session object request that identifies a session object;

storing in a first memory couple to a processor, the session object request: communicating a session object response that identifies a response to the session object request;

Communicating, via a message queue, with application instances accessible through application agents in communication with the handler agent, where the application agents are stored in the first memory;

Determining one or more of the application agents to which to forward the session object request;

forwarding the message queue message to the determined one or more application agents;

identifying, using a hash table agent comprising a second memory, a hash-mapped key-value that identifies at least one location, including the first memory or the second memory or both, to store or retrieve a session object and state of the session object, wherein the hash table agent supported by a cloud platform extracts session object from the session object request and stores the session object cached in the second memory to a database at a user-defined time interval, and retrieves the session object from the database when the session object request is received and the session object is not cached in the second memory, and wherein the hash table agent aggregates a plurality of database requests for a session object corresponding to a first application into a first individual connection to the database related to the first application, and wherein the hash table agent aggregates a plurality of database requests for a session object corresponding to a second application into a second individual connection to the database related to the second application, wherein the first individual connection to the database is separate from the second individual connection to the database, and wherein the hash table agent mediates database reads and writes for storing and retrieving session objects;

receiving the session object request from the handler agent; communicating a request for session object state of the session object to the hash table agent;

receiving the session object and the session object state from the hash table agent; servicing the session object request, using the application instances accessible through application agents, based on the requested session object state to obtain a session object request result;

communicating an updated session object state and the session object request result to the hash table agent;

communicating the session object response to the handler agent based on the session object request result; and reading the session object request, de-serialize the session object and read the session object value in order to update the session object state or the application context or both.

11. The method of claim 10, further comprising:
sending, from the one or more application agents to the hash table agent via the message queue, a message queue message that identifies the session object to be retrieved;
receiving, by the one or more application agents, a message with the session object from the hash table agent.

12. The method of claim 10, where the session object request is for a HTTP request object, and where the session object response is for a HTTP response object.

13. The method of claim 10, further comprising: communicating, via the application agents, availability status of the application instances to the handler agent via another message queue message comprising the availability status.

14. The method of claim 10, where the handler agent, application agents, and hash table agent subscribe to the message queue.

15. The method of claim 10, further comprising: generating, by the hash table agent using the session object request, a hash-mapped key-value that identifies at least one location to store the session object in a Key-value store Hash Table, when the session object request is a request to store the session object.

16. The method of claim 10, further comprising: generating, by the hash table agent using the session object request, another hash-mapped key-value that identifies at least one location from which to retrieve the session object from a Key-value store Hash Table, when the session object request is a request to retrieve the session object.

17. The method of claim 10, further comprising: receiving from the application instances availability information for the application instances available to service the session object request, where the application agents communicate availability status of the application instances to the handler agent via another message queue message.

18. The method of claim 10, further comprising: wrapping the session object request in a message queue message, and serializing the session object using standard Java serialization.

19. A product comprising:
a first computer readable memory with processor executable instructions stored thereon;
a processor in communication with the first computer readable memory, wherein the processor is configured to execute the processor executable instructions to:
receive, using a user interface provided by a handler agent, a session object request that identifies a session object;

communicate a session object response that identifies a response to the session object request;

communicate, via a message queue, with application instances accessible through application agents in communication with the handler agent;

determine one or more of the application agents to which to forward the session object request;

forward the message queue message to the determined one or more application agents; identify, using a hash table agent comprising a second memory, a hash-mapped key-value that identifies at least one location, including the first computer readable memory or the second memory or both, to store or retrieve a session object and state of the session object, wherein the hash table agent supported by a cloud platform extracts session object from the session object request and stores the session object cached in the second memory to a database at a user-defined time interval, and retrieves the session object from the database when the session object request is received and the session object is not cached in the second memory, and wherein the hash table agent aggregates a plurality of database requests for a session object corresponding to a first application into a first individual connection to the database related to the first application, and wherein the hash table agent aggregates a plurality of database requests for a session object corresponding to a second application into a second individual connection to the database related to the second application, wherein the first individual connection to the database is separate from the second individual connection to the database, and wherein the hash table agent mediates database reads and writes for storing and retrieving session objects;

receive the session object request from the handler agent;

communicate a request for session object state of the session object to the hash table agent;

receive the session object and the session object state from the hash table agent;

service the session object request, using the application instances accessible through application agents, based on the requested session object state to obtain a session object request result;

communicate an updated session object state and the session object request result to the hash table agent;

communicate the session object response to the handler agent based on the session object request result; and read the session object request, de-serialize the session object and read the session object value in order to update the session object state or the application context or both.

* * * * *